(12) United States Patent
Bhardwaj (10) Patent No.: US 9,965,659 B2
(45) Date of Patent: May 8, 2018

(54) SYSTEM AND METHOD OF NOTIFYING AN OWNER OF A BLOCKING VEHICLE

(71) Applicant: Wipro Limited, Bangalore (IN)

(72) Inventor: Ankit Bhardwaj, Dehradun (IN)

(73) Assignee: WIPRO LIMITED, Bangalore (IN)

( * ) Notice: Subject to any disclaimer, the term of this patent is extended or adjusted under 35 U.S.C. 154(b) by 0 days. days.

(21) Appl. No.: 15/246,213

(22) Filed: Aug. 24, 2016

(65) Prior Publication Data
US 2017/0372100 A1     Dec. 28, 2017

(30) Foreign Application Priority Data
Jun. 28, 2016 (IN) .............................. 201641022115

(51) Int. Cl.
*G06K 7/10* (2006.01)
*G06K 19/04* (2006.01)
*H04L 12/58* (2006.01)

(52) U.S. Cl.
CPC ....... *G06K 7/10297* (2013.01); *G06K 19/045* (2013.01); *H04L 51/046* (2013.01)

(58) Field of Classification Search
IPC ................................................. G06K 7/10297
See application file for complete search history.

(56) References Cited

U.S. PATENT DOCUMENTS

| | | | | |
|---|---|---|---|---|
| 2006/0180647 A1* | 8/2006 | Hansen | ...................... | B60S 3/00 235/375 |
| 2011/0103650 A1* | 5/2011 | Cheng | ....................... | B60R 1/00 382/104 |
| 2014/0309917 A1* | 10/2014 | Beaurepaire | ........... | G08G 1/017 701/300 |

* cited by examiner

*Primary Examiner* — Kristy A Haupt
(74) *Attorney, Agent, or Firm* — Finnegan, Henderson, Farabow, Garrett & Dunner LLP (57) ABSTRACT

This disclosure relates generally to the field of wireless communication technology and more particularly to a system and a method of notifying an owner of a blocking vehicle. In one embodiment, a Block Notification System for notifying an owner of a blocking vehicle is disclosed. The Block Notification System comprises a processor and a memory communicatively coupled to the processor. The memory stores processor instructions, which, on execution, causes the processor to detect a RFID card of a user, wherein the RFID card of the user comprises vehicle information associated with a vehicle owned by the user. The processor further validates whether the RFID card of the user is associated with a blocked vehicle, wherein the blocked vehicle is a vehicle being blocked by the blocking vehicle. The processor further notifies an owner of the blocking vehicle based on validating the RFID card of the user.

14 Claims, 4 Drawing Sheets

FIG. 4: Example Computer System

SYSTEM AND METHOD OF NOTIFYING AN OWNER OF A BLOCKING VEHICLE

TECHNICAL FIELD

This disclosure relates generally to the field of wireless communication technology and more particularly to a system and a method of notifying an owner of a blocking vehicle.

BACKGROUND

One of the issues that plague developing countries, due to rapid development of automobile industry and increased population, is parking issue. In some situations, the number of vehicles may exceed the available parking spaces. A common example of this may be, availability of parking spaces at a mall over a weekend when a large number of people are expected. Frustrated by lack of parking space and shortage of time, some drivers may park their vehicles in a haphazard manner, blocking other vehicles. Their intention might be to return as soon as possible and remove their vehicle which is blocking someone else's vehicle.

In these scenarios, the owner of the blocked vehicle has no choice but to wait for the owner of blocking vehicle to return. The blocked vehicle owner may not have an idea as to how long to wait and there may be no way of informing the blocking vehicle owner.

SUMMARY

In one embodiment, a method of notifying an owner of a blocking vehicle is disclosed. The method comprises detecting a Radio Frequency identification (hereinafter referred to as 'RFID') card of a user, wherein the RFID card of the user comprises vehicle information associated with a vehicle owned by the user. The method further comprises validating whether the RFID card of the user is associated with a blocked vehicle, wherein the blocked vehicle is a vehicle being blocked by the blocking vehicle. The method further comprises notifying an owner of the blocking vehicle based on validating the RFID card of the user.

In another embodiment, a system for notifying an owner of a blocking vehicle is disclosed. The system comprises a processor and a memory communicatively coupled to the processor. The memory stores processor instructions, which, on execution, causes the processor to detect an RFID card of a user, wherein the RFID card of the user comprises vehicle information associated with a vehicle owned by the user. The processor further validates whether the RFID card of the user is associated with a blocked vehicle, wherein the blocked vehicle is a vehicle being blocked by the blocking vehicle. The processor further notifies an owner of the blocking vehicle based on validating the RFID card of the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for notifying an owner of a blocking vehicle. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for notifying an owner of a blocking vehicle is described in conjunction with FIG. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
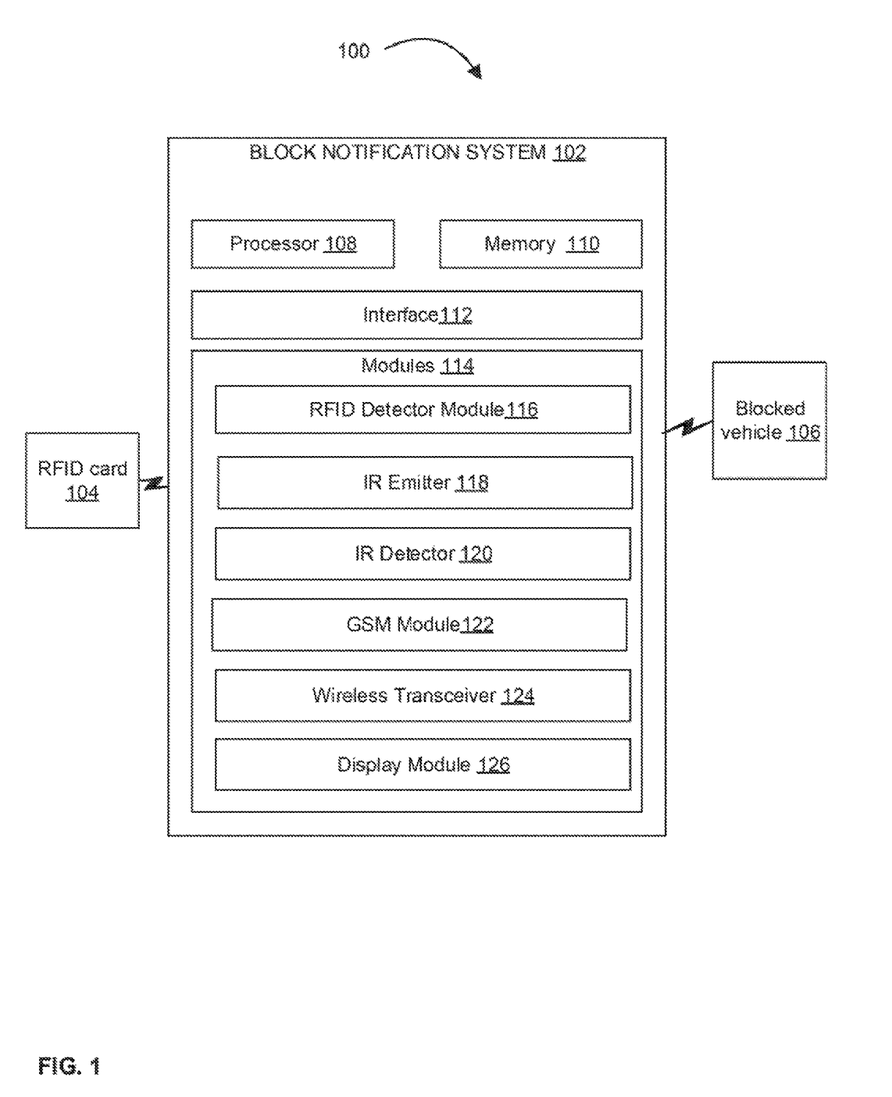
FIG. 1 illustrates an exemplary network implementation comprising a Block Notification System to notify an owner of a blocking vehicle, in accordance with some embodiments of the present disclosure.

FIG. 1 illustrates an exemplary network environment 100 comprising a Block Notification System 102, in accordance with some embodiments of the present disclosure. As shown in FIG. 1, the Block Notification System 102 is communicatively coupled to an RFID card 104 that may be associated with a user and may further be communicatively coupled to a blocked vehicle 106, wherein the blocked vehicle 106 is a vehicle being obstructed by a blocking vehicle. The RFID card 104 may comprise an RFID tag and an RFID antenna.

The Block Notification System 102 may be implemented on variety of computing systems. Examples of the computing systems may include a laptop computer, a desktop computer, a tablet, a notebook, a workstation, a mainframe computer, a server, a network server, and the like.

The RFID card 104 of a user may comprise vehicle information associated with a vehicle owned by the user. The vehicle information may comprise at least one of a vehicle identification number and a license plate number associated with the vehicle. The vehicle identification number may be a unique identifier for a specific automobile. In addition to the vehicle information, the RFID card 104 may further comprise user details. The user details may comprise at least one of a name of the user or user's license details.

The Block Notification System 102 may be communicatively coupled to the RFID card 104 and the blocked vehicle 106 through a wireless network. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

As shown in FIG. 1, the Block Notification System 102 comprises a processor 108, a memory 110 coupled to the processor 108, and interface(s) 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the Block Notification System 102 to interact with RFID card 104. Further, the interface(s) 112 may enable the Block Notification System 102 to communicate with other computing devices.

In one example, the Block Notification System 102 includes modules 114. In one embodiment, the modules 114, may be stored within the memory 110. In one embodiment, the modules 114 amongst other things, may include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 may include an RFID Detector Module 116, an Infrared Emitter Module 118, an Infrared Detector Module 120, a Global System for Mobile Communication (GSM) Module 122, a Wireless Transceiver Module 124, and a Display Module 126. In one embodiment, the Display Module 126 may be a Liquid Crystal Display (LCD) screen. GSM Module 122 is a module that enables the Block Notification System 102 to communicate over the mobile network. In an example, the modules 114 may also comprises other modules. The other modules may perform various miscellaneous functionalities of the Block Notification System 102. It will be appreciated that such aforementioned modules may be represented as a single module or a combination of different modules.

In order to notify an owner of a blocking vehicle, an RFID card 104 of a user, introduced within a read range of the RFID detector Module 116, may be detected. In some embodiments, the RFID card 104 may be a passive RFID system, wherein the RFID is self-powered and does not need a separate battery. In one embodiment, the RFID Detector Module 116 may be an active RFID system, wherein the RFID may contain separate batteries. The RFID card 104 of the user may comprise at least one of vehicle information and user details. The vehicle information and the user details may be digitally encoded on the RFID card. The vehicle information may comprise at least one of a vehicle identification number and a license plate number associated with the vehicle. The user details comprises at least one of a name of the user and user's license details. The details that are digitally encoded on to the RFID card 104 may be decoded by the processor 108 and stored to the memory 110.

After detecting the RFID card 104, processor 108 may activate the IR Emitter Module 118, placed in anterior and posterior ends of the blocking vehicle, to determine the distance of the blocking vehicle from the blocked vehicle 106. The IR Emitter Module 118 may transmit infrared radiation to the blocked vehicle 106. The infrared radiation may be reflected off the blocked vehicle and received by the IR Detector Module 120 to determine the distance of the blocked vehicle 106 from the blocking vehicle. This may be done by taking into account time taken by the transmitted infrared radiation to reach the blocking vehicle after being reflected by the blocked vehicle 106 and speed of light. Distance thus determined may be compared with a predetermined threshold, wherein the predetermined threshold may indicate an optimal distance, where the "blocked" vehicle 106 may pass without difficulty. If the distance is greater than or equal to the predetermined threshold, then a notification may be sent to the Display Module 126. In one embodiment, the Display Module 126 may display a message "Cannot perform further validation since vehicle can pass".

When the distance between the blocked vehicle 106 and the blocking vehicle is within a predetermined threshold, processor 108 may validate whether the RFID card 104 of the user is associated with the blocked vehicle 106. This validation may be done by once again activating the IR Emitter Module 118, placed in the anterior and posterior ends of the blocking vehicle. The IR Emitter Module 118 may transmit infrared radiations to the blocked vehicle 106. An IR detector Module (not shown in FIG.) associated with the blocked vehicle 106 may detect the infrared radiations and trigger a processor (not shown in FIG.) associated with the blocked vehicle 106 to provide vehicle details of the blocked vehicle 106 to the processor 108. Here, the vehicle details of the blocked vehicle 106 may be stored in a memory (not shown in FIG) associated with the blocked vehicle 106. The vehicle details may comprise at least one of vehicle identification number or a license plate number associated with the blocked vehicle 106. Transfer of the vehicle details of the blocked vehicle 106 may take place from a transceiver (not shown in FIG) associated with the blocked vehicle 106 to the transceiver 124 associated with the blocking vehicle. The vehicle details may be sent to the processor 108 associated with the blocking vehicle, where the processor 108 may compare the vehicle details of the blocked vehicle 106 with the vehicle information corresponding to the RFID card 104 associated with the user. The user associated with RFID card 104 may be inferred to be the owner of the blocked vehicle 106 if the vehicle details of the blocked vehicle 106 matches the vehicle information corresponding to the RFID card 104.

When the RFID card 104 of the user is found to be associated with the blocked vehicle 106, then the GSM Module 122 may notify the owner of the blocking vehicle that his vehicle is obstructing another vehicle. The GSM module 122 may transmit a predefined message to the owner of the blocking vehicle. In one embodiment, when the message is forwarded to the blocking vehicle owner, a message may be displayed on the Display Module 126. For instance, "Vehicle Owner has been notified." In another embodiment, when the message is forwarded to the owner of the blocking vehicle, another message may be sent to traffic police. The message sent to the traffic police may also be formulated by the GSM Module 122 and it may be used to inform the traffic police that the user has messaged the owner of the blocking vehicle. This may be done for security reasons. The message to the traffic police may comprise at least one of the vehicle information associated with the blocked vehicle 106, user details of the user or vehicle information associated with the blocking vehicle. For instance the message may be "The owner of vehicle with license plate number "ABC-123" and vehicle identification number 1HGBH41JXMN109186, named "Stuart", has just pinged the owner of ABC-456".

When it is found that the RFID card 104 of the user is not associated with the blocked vehicle 106, there arises a false positive. This may be interpreted as a situation where although the RFID card 104 was detected, no vehicle was obstructed. In this scenario there may be no need to message the owner of the blocking vehicle.

On receiving the notification, the owner of the blocking vehicle may respond to the message sent by the GSM module 122. The response may be displayed on the Display Module 126 thereby providing an update to the user. Since the messages are exchanged between blocked vehicle owner and blocking vehicle owner through the GSM Module 122 of the blocking vehicle, without exchanging their phone numbers, the Block Notification System 102 provides high security.

Figure 2:
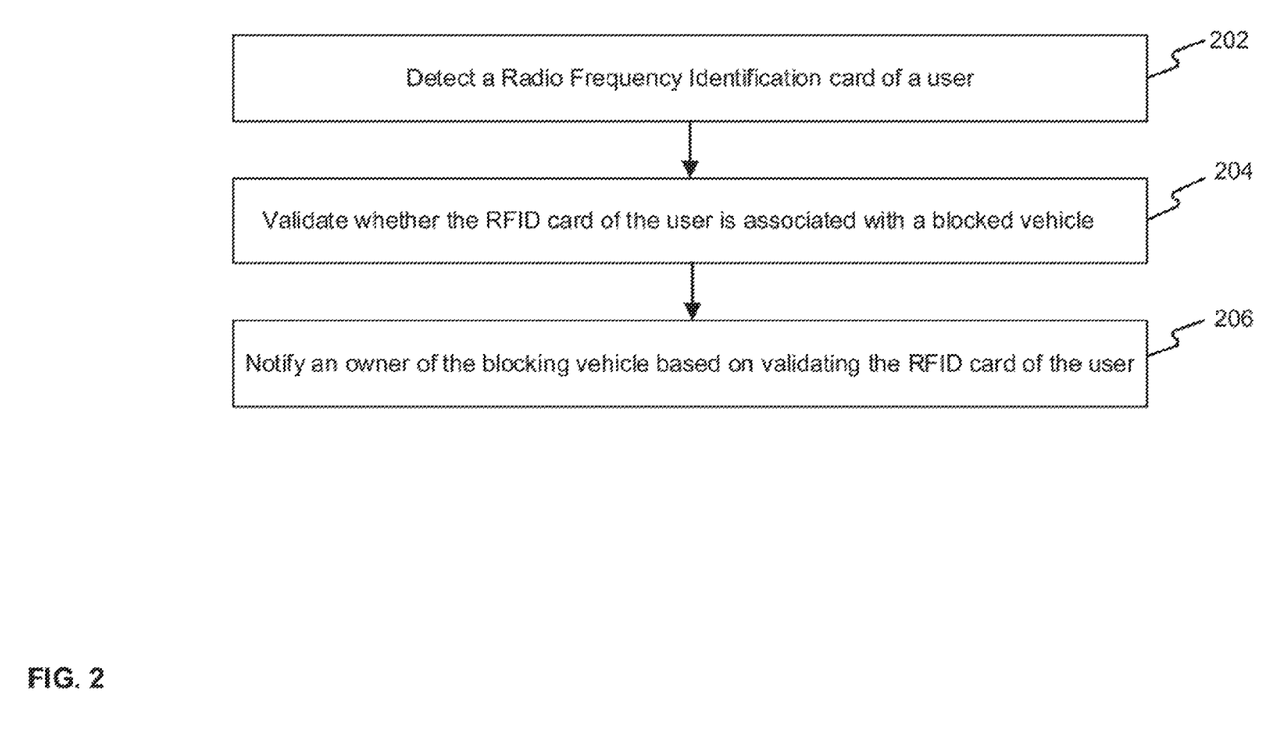
FIG. 2 illustrates an exemplary method of notifying an owner of a blocking vehicle, in accordance with some embodiments of the present disclosure.

FIG. 2 illustrates an exemplary method of notifying an owner of a blocking vehicle. With reference to FIG. 2, at step 202, a RFID card 104 of a user may be detected by a Block Notification System 102 associated with a blocking vehicle, wherein the RFID card 104 of the user comprises at least one of vehicle information or user details. The vehicle information comprises at least one of a vehicle identification number or a license plate number associated with the vehicle. The user details comprises at least one of a name of the user or user's license details.

In some embodiments, the RFID card 104 may be a passive RFID system and the RFID Detector Module 116 may be an active RFID system. The passive RFID card 104 may not need a separate battery for energy. The active RFID detector Module 116 may need a separate battery. The battery may last for 3 to 5 years, on an average. In one embodiment, the battery may be recharged using battery of the vehicle. The passive RFID system may have relatively less range compared to active RFID system. Active RFID systems may have one or more inbuilt batteries. Even though active RFID systems are more expensive compared to passive RFID systems, they provide the advantage of greater read range.

After detecting the RFID card 104 of the user, validation may take place to check whether the RFID card 104 of the user is associated with a blocked vehicle 106, at step 204. The RFID card 104 of the user may contain details of a vehicle owned by the user. These details may be compared with vehicle details retrieved from the blocked vehicle 106 to determine if the RFID card 104 does in fact belong to the owner of the blocked vehicle 106. The process of validation is explained in further detail in conjunction with FIG. 3.

In addition to validating whether the RFID card 104 of the user is associated with a blocked vehicle 106, distance between the blocked vehicle 106 and the blocking vehicle may be calculated to determine whether the distance is below a predetermined threshold. The predetermined threshold may indicate an optimal distance, where the vehicle owned by the user may pass without difficulty. In order to determine the distance between the blocking vehicle and the blocked vehicle 106, the IR Emitter Module 118, placed on the anterior and posterior ends of the blocking vehicle, may be activated. The IR Emitter Module 118 may transmit infrared radiation to the blocked vehicle 106. The infrared radiation may be reflected off the blocked vehicle and received by the IR Detector Module 120 to determine the distance of the blocked vehicle 106 from the blocking vehicle. This may be done by taking into account time taken by the transmitted infrared radiation to reach the blocking vehicle after being reflected by the blocked vehicle 106 and speed of light. The processor 108 may compare this distance with the predetermined threshold to analyze whether the vehicle was in fact blocked.

After validating whether the RFID card 104 of the user is associated with a blocked vehicle 106 and the distance between the blocked vehicle 106 and the blocking vehicle is below the predetermined threshold, the owner of the blocked vehicle 106 is notified based on the validation of the RFID card 104, at step 206. The blocking vehicle owner may be informed that his vehicle is obstructing another vehicle, by the GSM Module 122. The GSM Module 112 may transmit a predefined message to the owner of the blocking vehicle thereby notifying the owner of the blocking vehicle.

Figure 3:
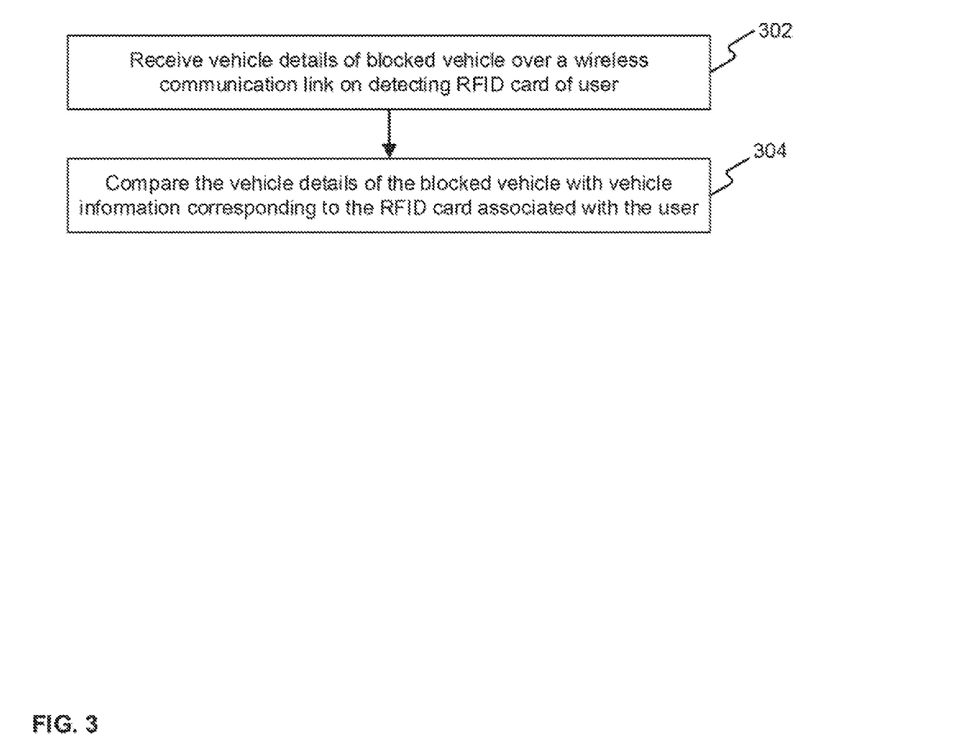
FIG. 3 illustrates an exemplary method of validating whether the RFID card of the user is associated with the blocked vehicle, in accordance with some embodiments of the present disclosure.

FIG. 3 illustrates an exemplary method of validating whether the RFID card 104 of the user is associated with the blocked vehicle 106. The vehicle details of the blocked vehicle 106 may be received over a wireless communication link, at step 302. In order to obtain the vehicle details of the blocked vehicle 106, an IR Emitter Module 118 placed at a posterior end and an anterior end of the blocking vehicle may be activated. The IR Emitter Module 118 may transmit infrared radiation to the blocked vehicle 106. The IR detector Module, associated with the blocked vehicle 106 may receive the infrared radiation. This radiation may act as a trigger to the processor to extract vehicle details associated with the blocked vehicle 106 from the Memory associated with the blocked vehicle 106. Thereafter, the vehicle details of the blocked vehicle 106 may be transmitted to the blocking vehicle over a wireless communication link.

After receiving the vehicle details associated with the blocked vehicle 106, the vehicle details may be compared with vehicle information associated with the RFID card 104 of the user. For example, the processor 108 may compare the vehicle identification number of the blocked vehicle 106 with the vehicle identification number digitally encoded in the RFID card 104. Similarly, the processor 108 may compare the license plate number of the blocked vehicle 106 with the license plate number digitally encoded on to the RFID card 106.

Computer System

Figure 4:
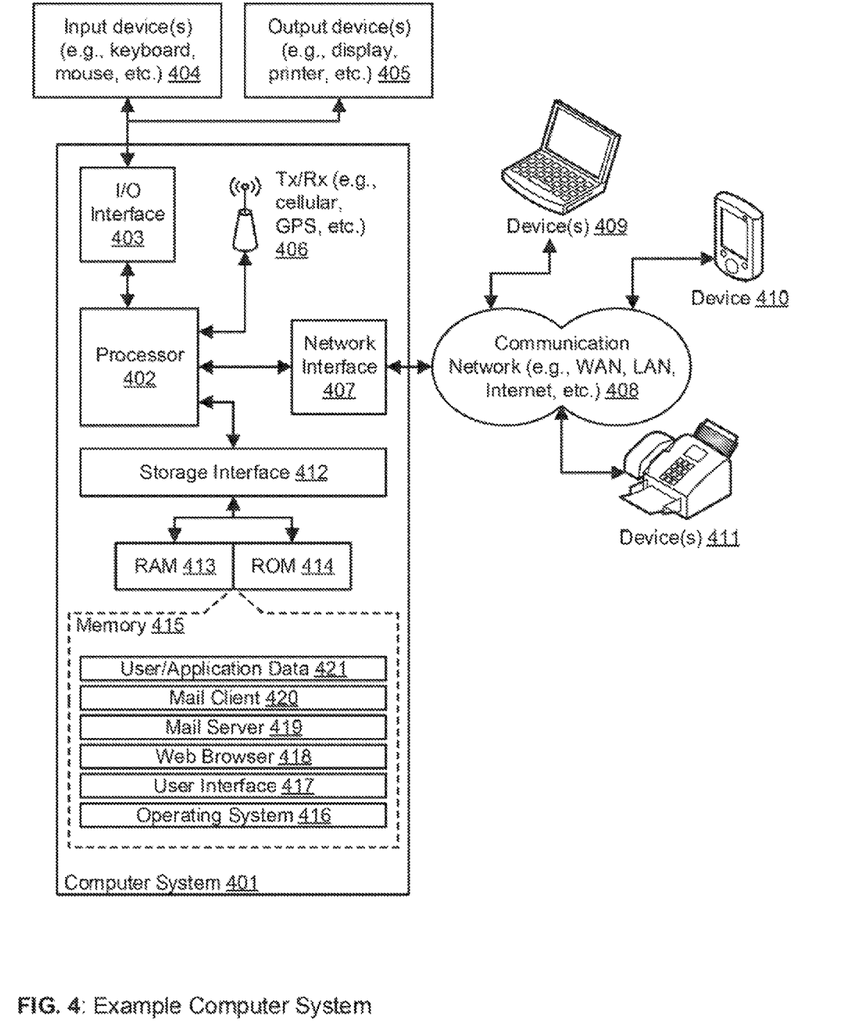
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the modeler 118, the analyzer 120, and the prediction module 122 presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monosural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component.

The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods predicting occurrence of an event in an IT infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of notifying an owner of a blocking vehicle, the method comprising:
   detecting, by a Block Notification System associated with the blocking vehicle, an Radio Frequency Identification (RFID) card of a user, wherein the RFID card of the user comprises vehicle information associated with a vehicle owned by the user and is communicatively coupled to the vehicle;
   receiving, by the Block Notification System associated with the blocking vehicle, vehicle details of the blocked vehicle over a wireless communication link on detecting the RFID card of the user;
   validating, by the Block Notification System, whether the RFID card of the user is associated with a blocked vehicle, blocked by the blocking vehicle, wherein validating comprises comparing the vehicle details of the blocked vehicle received over the wireless communication link with the vehicle information in the RFID card; and
   notifying, by the Block Notification System, an owner of the blocking vehicle based on validating the RFID card of the user.

2. The method as claimed in claim 1, wherein the vehicle information comprises at least one of a vehicle identification number or a license plate number associated with the vehicle.

3. The method as claimed in claim 1, wherein the RFID card of the user further comprises user details.

4. The method as claimed in claim 3, wherein the user details comprises at least one of a name of the user or user's license details.

5. The method as claimed in claim 1, further comprising determining a distance between the blocked vehicle and the blocking vehicle.

6. The method as claimed in claim 5, further comprising notifying the owner of the blocking vehicle when the distance between the blocked vehicle and the blocking vehicle is below a predetermined threshold.

7. The method as claimed in claim 5, wherein determining the distance between the blocked vehicle and the blocking vehicle comprises:
   transmitting infrared radiation to the blocked vehicle using an emitter associated with the blocking vehicle;
   receiving infrared radiation reflected from the blocked vehicle using a detector associated with the blocking vehicle; and
   determining the distance between the blocked vehicle and the blocking vehicle based on the received radiation.

8. A Block Notification System for automatically notifying an owner of a blocking vehicle, the Block Notification System comprising:
   a processor; and
   a memory communicatively coupled to the processor, wherein the memory stores the processor-executable instructions, which, on execution, causes the processor to:
      detect a RFID card of a user, wherein the RFID card of the user comprises vehicle information associated with a vehicle owned by the user and is communicatively coupled to the vehicle;

receive vehicle details of the blocked vehicle over a wireless communication link on detecting the RFID card of the user;

validate whether the RFID card of the user is associated with a blocked vehicle, blocked by the blocking vehicle, wherein validating comprises comparing the vehicle details of the blocked vehicle received over the wireless communication link with the vehicle information in the RFID card; and notify an owner of the blocking vehicle based on validating the RFID card of the user.

9. The Block Notification System as claimed in claim 8, wherein the vehicle information comprises at least one of a vehicle identification number and a license plate number associated with the vehicle.

10. The Block Notification System as claimed in claim 8, wherein the RFID card of the user further comprises user details.

11. The Block Notification System as claimed in claim 10, wherein the user details comprises at least one of a name of the user or user's license details.

12. The Block Notification System as claimed in claim 8, wherein the processor is further configured to determine a distance between the blocked vehicle and the blocking vehicle.

13. The Block Notification System as claimed in claim 12, wherein the processor is further configured to notify the owner of the blocking vehicle when the distance between the blocked vehicle and the blocking vehicle is below a predetermined threshold.

14. The Block Notification System as claimed in claim 12, wherein the processor is configured to determine the distance between the blocked vehicle and the blocking vehicle by:

transmitting infrared radiation to the blocked vehicle using an emitter associated with the blocking vehicle;

receiving infrared radiation reflected from the blocked vehicle using a detector associated with the blocking vehicle; and determining the distance between the blocked vehicle and the blocking vehicle based on the received radiation.

* * * * *